United States Patent Office 3,132,034
Patented May 5, 1964

3,132,034
HARDBOARD SATURANT COMPOSITIONS
James F. Mayer, Hinsdale, Ill., assignor to Standard Oil Company, Chicago, Ill., a corporation of Indiana
No Drawing. Filed Dec. 28, 1960, Ser. No. 78,818
8 Claims. (Cl. 106—123)

This application relates to hardboards and particularly to saturants used in tempering hardboards, and to tempering processes using such saturants.

Hardboards are broadly defined as compressed mats composed of wood fibers. They are generally made by either a wet forming or a dry forming process. In the wet forming process, the wood fibers may be formed by either a steam explosion method or by a dry mechanical method. In the steam explosion method, chips from small logs are subjected in an autoclave to saturated steam at increasing pressures, terminating at a pressure of about 1,000 p.s.i.g., for a short period of time, on the order of about one minute. At the end of the steaming operation, the pressure is released as quickly as possible, almost instantaneously, causing the fiber bundles to explode into the basic fiber strands. An advantage of the steam explosion method is that the natural lignin binder of the wood is not destroyed, nor is the fiber integrity reduced.

An alternative means of fiber formation for use in a wet forming process uses opposed rotating steel disks to reduce wood chips to fibers. Another alternative method for fiber formation feeds wood chips into a screw-type conveyor in which the chips are subjected to mechanical abrasion and also the action of high pressure steam and, in some instances, various chemicals, in order to produce fibers.

After the wood has been converted into fiber form, the fibers are suspended in a water slurry which is fed into a modified Fourdrinier machine where the fibers are formed into sheets, compacted at moderate pressures and partially dried. Thereafter they are cut into boards of convenient size, generally 4 ft. x 8 ft.

The cut boards are then compressed for a few minutes at a moderately high temperature, such as 350° F., under about 1,000 p.s.i.g. pressure. After pressing, the hardboard is ready for use but has a relatively low flexure strength modulus, generally in the range of 4,500–6,000 p.s.i. The flexure modulus of the boards after the pressing operation may be increased by adding a small amount, about 1–2% by weight based on dry wood, of a phenolic resin binder to the slurry fed to the Fourdrinier machine. By so using phenolic binder, the flexure modulus of the dry board may be increased to about 6,000–8,000 p.s.i.

The dry forming method of making hardboard omits the formation of a water slurry of the fibers and the use of the Fourdrinier machine, and instead combines mechanically grounded wood chips with a thermosetting resin. The mixture of fibers and resin is then pressed under high pressure and elevated temperatures until the resin sets.

Generally hardboard made by the wet forming method will have a greater density and a greater flexure modulus than hardboard made by the dry forming process.

In order to improve the surface hardness, durability and waterproofness of hardboards made as described hereinabove, the hardboard is tempered by dipping the board into a bath of a hardboard saturant and thereafter curing the saturant by exposure to air at atmospheric conditions or, more generally, curing in an oven at temperatures between about 200 to 400° F. The saturant used generally comprises a hydrocarbon drying oil, vegetable or marine drying oils, a hydrocarbon solvent oil and, optionally, driers and anti-oxidants. By so tempering the hardboard, the flexure modulus may be increased to the range of about 9,000 to 11,000 p.s.i. This is of considerable importance commercially because many applications of hardboard in the construction industry require a flexure modulus of at least 9,000 p.s.i., and Federal Specification LLL–F–311 requires a minimum flexure modulus of 10,000 p.s.i. for tempered hardboard of one-eighth inch thickness.

In some of the uses to which hardboard is put, particularly the manufacture of furniture, it is necessary to glue the hardboard to itself or to some other material. In such uses the strength of the glue bond is important. Both the type of glue used and the surface characteristics of the tempered hardboard influence strength of the glue bond. Usually polyvinyl acetate emulsion glue is used commercially because of its ease of handling and application and because of its minimum cost relative to other glue. Unfortunately, use of polyvinyl acetate glue requires a superior surface of the tempered hardboard in order to form a satisfactory glue bond. Hardboard saturants comprising a hydrocarbon drying oil, a vegetable or marine drying oil and a hydrocarbon solvent oil have been found to give an unsatisfactory surface for use with polyvinyl acetate emulsion glues. The surface is unsatisfactory in the sense that, when two pieces of hardboard are glued together and then subjected to a tensile strength test, the glue line bond fails before the internal fiber bonds of the hardboard fail.

It has now been discovered that a hardboard saturant comprising a hydrocarobn drying oil, a second drying oil selected from the vegetable oils, marine oils or mixtures thereof, and tall oil, and substantially no hydrocarbon solvent oils, may be used to temper hardboard which, after tempering, will have a flexure modulus substantially comparable to that of hardboard tempered with saturants which contain a hydrocarbon solvent oil but not tall oil and in addition will also have a surface which, when glued with polyvinyl acetate glue, will form a bond stronger than the internal fiber bond of the tempered hardboard and have a relative adhesion factor, as hereinafter defined, in the range of about 70–100. The hydrocarbon drying oil preferably has an iodine number (Wijs) between about 75 to 350. The saturant may include minor amounts of driers and antioxidants.

In another aspect the invention comprises a process for making hardboard tempered by contacting with a saturant as described above, and the hardboard so produced.

Various types of hydrocarbon drying oils may be used. They may have an iodine number (Wijs) between about 75 and 350, preferably between about 150 and 200. While the hydrocarbon drying oil may have an initial boiling point of 200–300° F., it is preferable that at least 50%, and advantageously 75%–90%, thereof should boil at a temperature higher than about 400° F. Examples of hydrocarbon drying oils are Gray tower polymer, clay tower polymer, polybutadiene, HF-oil, etc. A suitable drying oil can be prepared by the polymerization of unsaturated liquid hydrocarbon fractions produced in the high temperature pyrolysis (1200–1500° F. at short contact times of .01 to 10 seconds) of gaseous or liquid hydrocarbons. Drip oil, sometimes known as Dripolene, is produced during the pyrolysis. These oils are rich in olefinic and diolefinic hydrocarbons and free of saponifiable materials. As an example, one of such oils boils between about 200 and 700° F., has an iodine number (Wijs) of 150–200, and a maleic anhydride value of 5–50 mg./g. The drip oils may be polymerized either thermally or catalytically to yield the product hydrocarbon drying oil. Any suitable catalytic polymerization technique such as strong acid or Friedel-Crafts metal halide catalyzed methods may be used. Thermal polymerization may be effected at temperatures of 300–600° F. over a period of about 5–40 hours. After polymerization is effected, the product is stripped of low boiling monomeric materials to yield the product hydrocarbon drying oil that is used in the wallboard saturant composition.

A particularly suitable hydrocarbon drying oil is the product obtained by thermal polymerization of an unsaturated liquid hydrocarbon fraction boiling within the range of 150–700° F., produced by the high temperature pyrolysis of hydrocarbons. Such a hydrocarbon drying oil will have a viscosity of between about 850 and 1,150 SSU at 210° F., typically 1,000 and an iodine number (Wijs) of at least 120 and a flash point of at least 260° F., Cleveland open cup, typically 285° F.

The second drying oil may be either a vegetable oil or a marine oil, such as a fish oil, or mixtures thereof. Any of a wide variety of oils may be used, including vegetable oils, such as linseed oil, soybean oil, tung oil, castor oil, perilla oil, safflower oil, walnut oil, and fish oils such as menhaden, pilchard or sardine oil. The vegetable and marine oils may have been processed, such as being "bodied" by ageing, boiling, or otherwise heated, whereby co-polymers are formed. The oils may have been oxidized by blowing with air at ordinary or elevated temperatures to increase viscosity, or otherwise refined by processes such as "winterizing" solvent extraction, distillation under vacuum, or contacted with liquid propane. Preferred vegetable oils are linseed oil, cotton seed oil, and soybean oil; preferred marine oils are fish oils. It is to be understood that the term vegetable oil as used herein does not include tall oil. This exclusion is made in order that the claims will not encompass a saturant comprising a hydrocarbon drying oil, a second drying oil which would otherwise include tall oil, and more tall oil.

Tall oil is a natural mixture of rosin acids obtained by acidifying the black liquor skimmings of the sulfate process of wood pulp manufacture when using resinuous woods. Tall oil is available as an item of commerce in either a crude or refined grade. Either grade of tall oil is satisfactory for use in the hardboard saturant herein claimed.

The hydrocarbon solvent oils which are substantially omitted from the hardboard saturant compositions when tall oil is used, as herein claimed, are generally petroleum oils boiling below about 750° F. but having a major proportion, preferably 80 to 100%, boiling above 300° F. When used, it is desired that the hydrocarbon solvent oils boil high enough to prevent flashing during the curing of the saturant, yet not so high as to prevent volatilization during the curing step. A typical hydrocarbon solvent oil suitable for use in saturants has a gravity of about 23–26° A.P.I. at 60° F., a flash point of about 280–320° F., Cleveland open cup, an initial boiling point in the range of 500–600° F. and a 90% point of about 700° F.

The relative amounts of the three major constituents of the saturant herein claimed e.g., the hydrocarbon drying oil, the vegetable or marine oils or mixtures thereof, and the tall oil may vary over relatively wide limits. The amount of hydrocarbon drying oil is preferably in the range of about 20–50% by weight of the saturant, advantageously 25–45%. The amount of marine or vegetable oils or mixtures thereof is preferably in the range of about 15–60%, advantageously, 30 to 50%. When a marine oil such as fish oil is used, the amount thereof may be reduced relative to the amount of a vegetable drying oil which might have been used. The amount of tall oil used is preferably in the range of about 10–65%, advantageously, about 25–55%. A typical saturant will contain equal weight of each major constituent.

A drier may be added to the saturant in order to promote a more complete reaction of the drying oils. The amount, if any, of the drier used may vary between about 0.1 and 10 weight percent of the saturant. Any of the common types of driers may be used, for instance, iron, cobalt or manganese naphthanates or mixtures thereof.

A hydroxy-aromatic compound may be used in the saturant, whether or not a drier is used, in order to inhibit spontaneous combustion of the saturant during the curing step. Suitable hydroxy-aromatic compounds are hydroquinone, di-tertiary butyl paracresols, substituted bisphenols, alpha-naphthols and para-amino phenols. A particularly suitable anti-oxidant is 2,6-di-tertiary butyl-4-methylphenol. The hydroxy-aromatic compound may comprise from about 0.1 to 5 weight percent of the saturant, preferably 0.25–1.5 percent.

The saturant may be blended by simply mixing together the various constituents and blending thoroughly.

As described herein, various saturant compositions were used to temper specimens of hardboard, and the tempered specimens were then tested for flexure modulus and relative tensile strength when glued together. ASTM test D–790 was used for testing the flexure modulus. In that test, the test specimen is supported near but not at its edges, and loaded with a rounded knife edge at a point midway between the supports.

The rupture modulus of hardboard made on a Fourdrinier machine varies depending upon whether the fibers subjected to strain are positioned in the hardboard parallel to the line of travel through the Fourdrinier machine, or transverse to such line. The rupture modulus is greater, by a factor on the order of 4:3 or 5:4, when the strain is imposed on the transverse fibers. To compensate for such difference, specimens of each tempered hardboard were tested for rupture modulus both with and transverse to its lines of travel, and the rupture modulus reported is the arithmetic average of such tests.

In testing the tensile strength of the glue bond formed between two pieces of hardboard, the following procedure was used. Pieces of hardboard of a nominal one-eighth inch thickness were glued face to face without abrasion or other preparation of either face. The dimensions of the pieces of hardboard were one inch by six inch. The glue used was polyvinyl emulsion acetate. After the adhesive was applied, the test specimens were held under light pressure for about one-half hour, after which they were conditioned overnight in a chamber held at 25° C. and a relative humidity of 40–60%. In order to test the strength of the glue bond, the point of a one-fourth inch wide knife blade was inserted for a distance of about one-fourth inch into the glue line bond at one corner of the bonded specimens, and the knife blade was twisted, causing the two pieces of hardboard to separate. The measure of the suitability of the tempered hardboard surface for use with polyvinyl acetate glue has been termed the relative adhesion factor. When the foregoing test is conducted, the test specimens will pull apart along either the glue line or at some points within one or the other of the two pieces of hardboard. If the hardboard fails under tensile stress at points other than the glue line, it shows that the tensile strength of the glue bond is greater than the internal bond of the hardboard fibers. Accordingly, the relative adhesion factor is defined as the percent of the bonded surface wherein the glue bond did not fail.

A series of tests were conducted using nominal one-eighth inch thick hardboard made by the wet forming process. Prior to tempering, such boards had a flexure modulus of about 7,800 p.s.i. A number of pieces of such hardboard were tempered with a saturant of varying composition, and the tempered hardboards then subjected to the flexure and adhesive tests described above.

The hardboard was preheated to about 150° F., and then dipped into a pan of saturant having a temperature of about 250° F. The dipping time was less than one minute, generally about 30 seconds. Excess saturant was squeeged from the test specimens, which were then allowed to stand at atmospheric conditions for about an hour. The test specimens were then cured in a 300° F. oven for four hours. The amount of saturant picked up by the test specimens varied within the range of 3 to 5 weight percent, based on the untempered board. The flexure modulus and adhesive strength of bonded specimens was not effected by variations in saturant pick up within the 3 to 5 percent range. After the oven cure, the test specimens were subjected without further treatment to the flexure modulus and tensile strength tests.

A saturant comprising 65 parts by weight hydrocarbon drying oil, 35 parts of hydrocarbon solvent oil, 100 parts of linseed oil and no tall oil was used as a base case saturant. The hydrocarbon drying oil used in this saturant and in the other saturants described hereinafter was obtained by thermally polymerizing the highly unsaturated liquid hydrocarbon material obtained from the high temperature pyrolysis of hydrocarbons. Such hydrocarbon drying oil had a viscosity between 850 and 1150 SSU at 210° F., and an iodine number (Wijs) greater than 120. When used, the hydrocarbon solvent oil was a heavy catalytic gas oil. The linseed oil was a commercially available product.

Hardboard having a flexure modulus of 7800 p.s.i. was tempered with the foregoing saturant. The tempered hardboard had a flexure modulus of 9700 p.s.i., but a relative adhesion factor of zero, i.e., all of the failure occurred at the glue bond surface.

A second saturant composition was prepared using equal parts by weight of the hydrocarbon drying oil, linseed oil, and tall oil, and no hydrocarbon solvent oil. The hardboard tempered with this second saturant composition had a flexure modulus of 10,100 p.s.i. and a relative adhesion factor of 100, i.e., none of the failure occurred at the glue line.

A third saturant composition was blended using 65 parts by weight of the hydrocarbon drying oil, 35 parts of linseed oil, 100 parts of tall oil and no hydrocarbon solvent oil. The hardboard tempered with this third composition had a flexure modulus of 9,500 p.s.i. and a relative adhesion factor of 100.

A fourth saturant composition was blended using 65 parts by weight of the hydrocarbon drying oil, 35 parts of the hydrocarbon solvent oil, and 100 parts of tung oil and no tall oil. The hardboard tempered with this fourth composition had a flexure modulus of 10,300 p.s.i. and a zero relative adhesion factor.

A fifth composition was blended using 65 parts by weight of the hydrocarbon drying oil, no hydrocarbon solvent oil, 35 parts by weight of tung oil and 100 parts of tall oil. The hardboard tempered with this fifth composition had a flexure modulus of 9,500 p.s.i. and a relative adhesion factor of 80.

A sixth saturant composition was blended using 65 parts by weight of the hydrocarbon drying oil, no hydrocarbon solvent oil, 100 parts of a commercially available blend of fish oils and 35 parts of tall oil. The hardboard tempered with this sixth composition had a flexure modulus of 10,300 p.s.i. and a relative adhesion factor of 95.

Two additional properties considered in respect of hardboards are moisture resistance and alkali resistance. To test for moisture resistance, hardboard specimens are immersed in water at 25° C. for 24 hours. The increases in the thickness and in the weight of the specimens are reported as percent of swelling produced and percent of water uptake. Saturant compositions comprising tall oil did not affect the moisture resistance of hardboard tempered with such compositions relative to the moisture resistance of hardboard tempered with compositions which did not include tall oil.

The alkali resistance test is similar to the water resistance test, except that the specimens are immersed in a one-half percent sodium hydroxide solution for four hours. Results are reported as percent of alkali uptake and percent of swelling produced. The use of tall oil in saturant compositions did not affect the alkali resistance of hardboard tempered with such compositions relative to the alkali resistance of hardboard tempered with compositions which did not include tall oil. It is to be noted that commercially available hardboards are made with either two smooth surfaces, or one smooth and one rough surface. The former are designated S2S; the latter S1S. Generally, no difficulties attributable to the surface of the hardboard will be encountered in gluing when using one rough surface of type S1S; such difficulties are encountered when a smooth surface is glued.

Having thus described the invention what is claimed is:

1. A hardboard saturant consisting essentially of about 20 to 50 weight percent of a hydrocarbon drying oil having an iodine number (Wijs) between about 75 and about 350; about 15 to 60 weight percent of a second drying oil of the class consisting of vegetable oils, marine oils, and mixtures thereof; about 10 to 65 weight percent of tall oil; and 0 to about 10 weight percent of a drier; said saturant being substantially free of hydrocarbon solvent oils.

2. The saturant of claim 1 wherein said second drying oil is tung oil.

3. A hardboard saturant consisting essentially of about 33.3 weight percent of a hydrocarbon drying oil having a viscosity between about 850 and 1150 SSU at 210° F., and a Cleveland open cup flash point of at least 260° F., and an iodine number (Wijs) of about 120; about 33.3 weight percent of linseed oil; and about 33.3 weight percent of tall oil; said saturant being substantially free of hydrocarbon solvent oils.

4. A hardboard saturant consisting essentially of about 32.5 weight percent of a hydrocarbon drying oil having a viscosity of between about 850 and 1150 SSU at 210° F., and a Cleveland open cup flash point of at least 260° F., and an iodine number (Wijs) of about 120; about 17.5 weight percent of linseed oil; and about 50 weight percent of tall oil; said saturant being substantially free of hydrocarbon solvent oils.

5. A hardboard saturant consisting essentially of about 32.5 weight percent of a hydrocarbon drying oil having a viscosity of between about 850 and 1150 SSU at 210° F., and a Cleveland open cup flash point of at least 260° F., and an iodine number (Wijs) of about 120; about 17.5 weight percent of tung oil; and about 50 weight percent of tall oil; said saturant being substantially free of hydrocarbon solvent oils.

6. A hardboard saturant composition consisting essentially of about 32.5 weight percent of a hydrocarbon drying oil having a viscosity of between about 850 and 1150 SSU at 210° F., and a Cleveland open cup flash point of at least 260° F., and an iodine number (Wijs) of about 120; about 50 weight percent of fish drying oils; and about 17.5 weight percent of tall oil; said saturant being substantially free of hydrocarbon solvent oils.

7. The saturant of claim 1 wherein said second drying oil is linseed oil.

8. The saturant of claim 1 wherein said second drying oil comprises a fish oil.

References Cited in the file of this patent

UNITED STATES PATENTS

| | | |
|---|---|---|
| 2,424,458 | Heijmer | July 22, 1947 |
| 2,434,974 | Woerner | Jan. 27, 1948 |
| 2,468,956 | Burg | May 3, 1949 |
| 2,544,391 | Marling | Mar. 6, 1951 |
| 2,744,013 | Dorland | May 1, 1956 |
| 3,056,718 | Grissom et al. | Oct. 2, 1962 |

FOREIGN PATENTS

| | | |
|---|---|---|
| 594,946 | Canada | Mar. 22, 1960 |